Patented Nov. 26, 1946

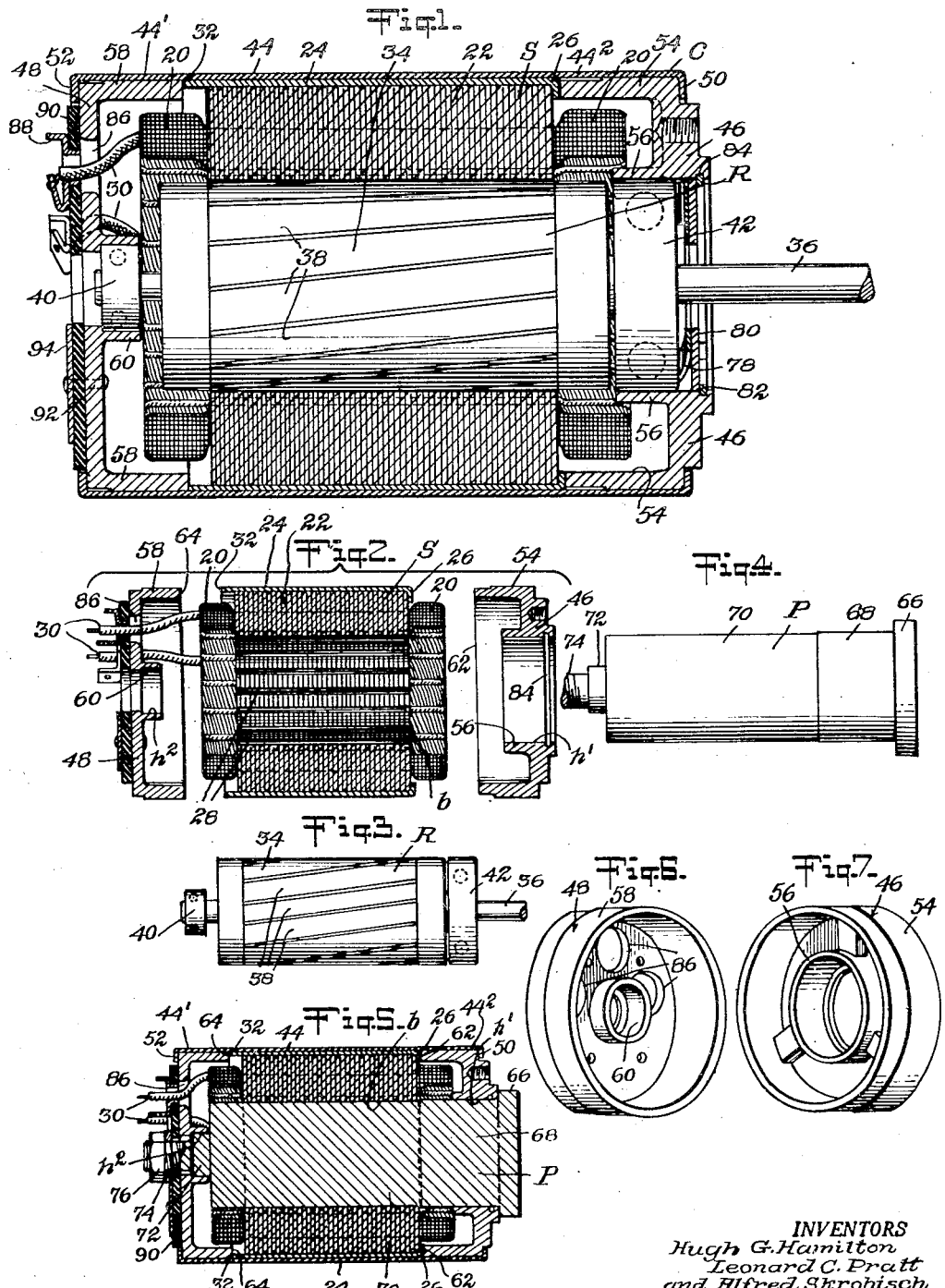

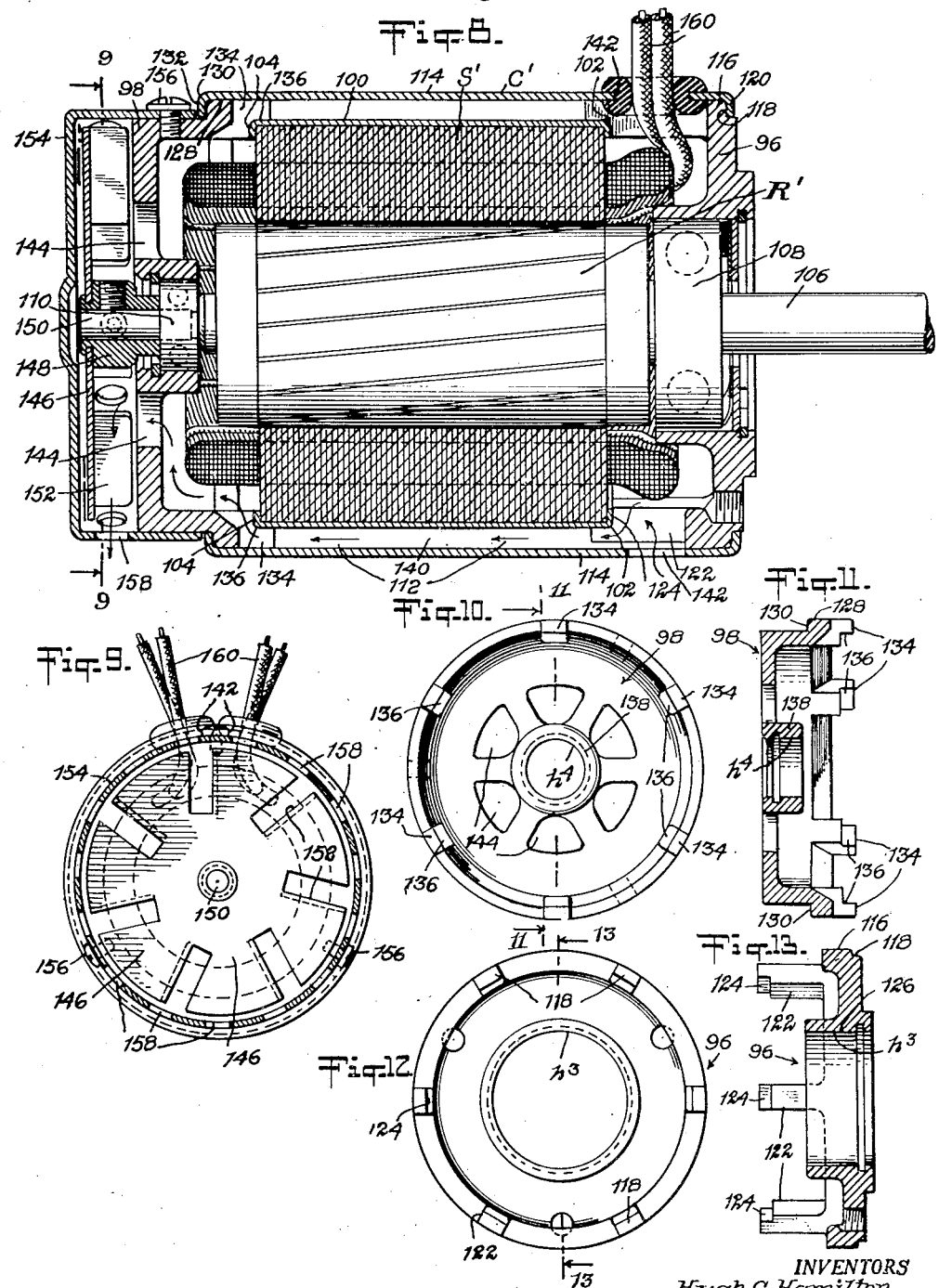

2,411,684

UNITED STATES PATENT OFFICE 2,411,684

DYNAMOELECTRIC MACHINE ASSEMBLY

Hugh G. Hamilton and Leonard C. Pratt, Baldwin, and Alfred Skrobisch, New York, N. Y., assignors to Eastern Air Devices, Inc., Brooklyn, N. Y., a corporation of New York Application August 31, 1943, Serial No. 500,636

11 Claims. (Cl. 171—252)

This invention relates to the manufacture of electric motors and has special reference to the provision of an improved method of constructing and assembling motors such as induction motors and to the improved resulting motor structures and assemblies.

The prime object of the present invention centers about the structural designing of the component parts of the motor, namely, the stator unit, the rotor unit and the motor casing so that these may be capable:

(a) of being assembled rapidly by mass production technique;

(b) of being put together to form strong and rigid motor structures, having the capacities for rough handling and durable use; and (c) of being built to produce a motor having an exceedingly smooth running operation and a good ratio of power to size.

To the accomplishment of this prime object and such other objects as may hereinafter appear, the invention is directed to the method of constructing and assembling electrical motors and to the motor structures set forth in the following specification and as sought to be defined in the appended claims. The specification is accompanied by drawings in which:

Fig. 1 is a longitudinal cross-sectional view of one form of assembled motor embodying the structural principles of our present invention;

Fig. 2 is a view portraying a step in the assembling of the stator unit and parts of the casing of the motor, the said parts being shown in longitudinal cross-section;

Fig. 3 is a view of the rotor used with this motor;

Fig. 4 is a view of an assembling plug used in the step of assembling the parts of Fig. 2;

Fig. 5 is a view depicting a subsequent assembly step and showing the manner in which the assembling of the stator and the motor casing is completed, the parts of this view being shown in longitudinal cross-section;

Fig. 6 is a perspective view of one of the end covers of the motor casing;

Fig. 7 is a perspective view of the other of the end covers of the motor casing;

Fig. 8 is a longitudinal cross-sectional view of a modified form of motor also embodying the structural principles of the present invention;

Fig. 9 is a view of Fig. 8 taken on a reduced scale and in cross-section in the planes of the broken line 9—9 of Fig. 8;

Fig. 10 is an interior view of one of the end covers used in the motor of this modification;

Fig. 11 is a view of Fig. 10 taken in cross-section in the plane of the line 11—11 of Fig. 10;

Fig. 12 is an exterior view of the other end cover used in the motor of this modification; and Fig. 13 is a view of the latter taken in cross-section in the plane of the line 13—13 of Fig. 12.

Referring now more in detail to the drawings and having reference first to the form of invention depicted in Figs. 1 to 7 thereof, the motor comprises the stator unit generally designated as S, the rotor unit generally designated as R and the casing generally designated as C for housing and supporting both the stator and rotor units, these component parts of the motor being constructed and associated to carry out the purposes of the invention above referred to. The motor illustrated in these figures of the drawings is a synchronous motor having an induction type rotor, the motor depicted being capable of operating on an A. C. supply line of 110 volts and 400 cycles.

The stator S comprises a coil structure 20 supported in a laminated core 22, the laminations of which are assembled within and secured to a metal such as an aluminum shell 24. This stator unit is in itself assembled in an improved way. A group of plate shaped laminations 22 are stacked in a drawn aluminum cup 24 which has one end 26 thereof already formed inwardly to make the supporting shoulder for the laminations. This cup 24 with the laminations therein is then forced through a sizing die which is a little smaller in diameter than the cup, with the result that the aluminum cup is tightly squeezed against the laminations, thus binding all the laminations securely in place. The laminations are so cut that when thus assembled there are provided the spaced longitudinally arranged grooves 28 into which the individual coils are inserted. The coils are grouped and connected at their opposite ends (at the ends of the laminated assembly) to form what has been designated as the coil structure 20 from which emanate the conductors or leads 30. The aluminum cup or shell 24 provides end abutable surfaces or edges, namely, the outer face of the inturned shoulder 26 and the opposite edge 32. It will be noted that in this form of the invention, due to the fact that the laminated assembly is tightly held by the cup, this end 32 of the cup need not be inwardly turned or spun over and may remain in the condition depicted in the drawings.

The rotor R separately shown in Fig. 3 comprises an induction motor type rotor element 34 fixed to a rotor shaft 36. The surface of the rotor element may be milled or ground to form the slots or flats 38 so as to define salient poles. On the opposite ends of the rotor shaft are preferably mounted the ball bearings 40 and 42 both preferably of the radial type, the ball bearing 40 having an outside diameter smaller than that of the diameter of the rotor element 34, while the ball bearing 42 has an external diameter either equal to or greater than, that is, at least equal to, the diameter of the rotor element 34, all for a purpose to be described hereinafter.

The casing C comprises a tubular casing section 44, a front end cover 46 and a rear end cover 48, the ends of the tubular casing section 44 being secured to the front and rear end covers by inturning or spinning over the ends 50 and 52 of the tubular casing into engagement with the end covers. The front end cover 46 separately shown in Fig. 7 of the drawings comprises a peripherally flanged and centrally bossed element and the rear end cover 48 separately shown in Fig. 6 of the drawings similarly comprises a peripherally flanged and centrally bossed element. The front end cover thus comprises an element having the peripheral flange 54 and a centrally arranged boss 56, the boss defining a central bearing hole for securely seating the external bearing of the ball bearing 42. The rear end cover 48 also thus comprises an element having the peripheral flange 58 and a centrally arranged boss 60, the boss defining a central bearing hole for the external bearing of the ball bearing 40.

The stator S, the rotor R and the casing C are so structurally designed as to enable the assembling of these component parts of the motor in the manner depicted in Figs. 2 to 5 of the drawings. The bearing hole $h'$ defined by the central boss 56 has a diameter at least equal (equal to or greater than) to that of the bore $b$ of the stator unit S. The bearing hole $h^2$ defined by the central boss 60 has a diameter no greater than and preferably smaller than the diameter of the stator bore $b$. The inside edge 62 of the front end cover is machined so that it will snugly abut the adjacent edge, namely, the shoulder 26, of the stator cup or shell 24. Similarly, the inside edge 64 of the rear end cover is formed to snugly abut the adjacent end, namely, the edge 32, of the stator cup or shell 24. With this structural design of these parts, the front end cover 46, the stator unit S and the rear end cover 48 are mountable or receivable on an aligning plug P (separately shown in Fig. 4), the aligning plug being provided with a supporting flange 66, a part 68 for fitting the front end cover hole $h'$, a part 70 for fitting the bore $b$ of the stator unit, a part 72 for fitting the hole $h^2$ of the rear end cover, and a threaded part 74 for receiving a temporary locking nut 76 (see Fig. 5). The plug P thereby serves as an aligning and an assembling plug for the front end cover, the stator unit and the rear end cover. These are assembled on the aligning plug in sequential abutting relation as best shown in Fig. 5 of the drawings, the inner edges 62 and 64 of the end covers snugly abutting against the contiguous ends 26 and 32 of the stator cup. When thus assembled, the lock nut 76 temporarily holds these parts in the assembled and accurately aligned condition.

When thus aligned and assembled, the tubular casing section 44 is then placed over the assembly and secured in position. The end portions 44' and 44² of this tubular casing 44 have an internal diameter (or diameters) the same as the external diameters of the flanges 58 and 54 of the end covers 48 and 46, respectively, whereby these end portions of the tubular casing accurately fit the outside walls or flanges of the end covers. In the form of the invention shown in Fig. 1, the outside diameter of the stator cup or shell 24 is the same as that or those of the flanges of the end covers so that the tubular casing 44 when slipped over the assembly shown in Fig. 5 snugly fits and encases the two end covers and the stator unit. At this point or step of the assembling operations, the edges 50 and 52 of the tubular casing are then swaged or spun over and inturned into engagement with the front faces or seats in the front and rear end covers 46 and 48, respectively, as is most clearly shown, for example, in Figs. 1 and 5 of the drawings. The tubular casing may be originally formed with the flanged edge 50 in which case the edge 52 is spun over in this step of the assembling operations. This inturning of the casing edges secures together the tubular casing, the end covers and the stator units into a stator and casing assembly. When this is done, the temporary nut 76 is removed and the plug P is withdrawn. By virtue of the fact that the bearing hole $h'$ is either equal to or larger than the stator bore $b$ and also by virtue of the fact that the bearing hole $h^2$ is no greater and is preferably less than the stator bore $b$, the plug P may be both inserted for its aligning function and withdrawn after the stator and casing assembly best depicted in Fig. 5 has been produced.

With the removal of the aligning and assembling plug P, the rotor R separately shown in Fig. 3 may now be substituted for the plug. Since the external bearings of the ball bearings 40 and 42 accurately fit and, therefore, may be snugly seated in the boring holes $h^2$ and $h'$, the rotor R thus simply replaces the plug P. It will be understood that the rotor unit 34 is somewhat smaller in diameter than the corresponding part 70 of the plug P to provide the necessary rotation clearance for the rotor. When the rotor R is thus inserted, it may be held in position by a spring plate 78, a washer 80 and a locking ring 82 (see Fig. 1) which locking ring is received by a groove 84 in the front end plate. In the assembling of the parts, the leads or conductors are first threaded through suitable orifices 86 provided in the rear end cover 48. These may be soldered to connectors 88 which are mounted on an insulation plate 90 and affixed as by means of rivets 92 to the rear end cover (see Fig. 1). 94 is a name plate which may be secured in position by means of some of these rivets.

By means of this provided structure, it will be observed that the following results are achieved: The stator unit S, the casing C (and its component parts) and the rotor R are assembled to produce the motor unit shown in Fig. 1 by very rapid assembling methods embodying the simplified steps depicted in Figs. 2 to 5 of the drawings. The motor may thus be assembled with speed and efficiency by mass production technique. The stator and casing assembly produced in the steps shown in Fig. 5 forms a very rigid and strong unit. The bearing holes as well as the stator bore of this assembly are perfectly aligned. This together with the rigid frame structure provided (the stator and casing assembly) renders possible not only the substantially perfect alignment and mounting of the rotor R in the motor, but also renders possible a smooth running operating rotor and a support therefor which resists any frame altering or distorting strains. A motor unit thus results which is strong and sturdy, capable of being subjected to rough handling and which is very durable in use. By means of the simple assembling methods afforded, the unit may be made economically.

In Figs. 8 to 13 of the drawings I show a modified form of motor embodying the structural principles of the invention. In this modification, the motor is constructed to provide paths therein for the circulation therethrough of a cooling medium (such as air) induced therethrough by the provision of a blower or fan associated with the motor. In this form of the invention, this path for the circulation of the cooling medium includes an annular space between the motor casing and the stator unit. The structural principles of the invention above described are nevertheless carried out in conjunction with the provision of cooling mechanism for the motor. This form of the invention is applied to an induction motor capable of operating from an A. C. supply of 110 volts and 400 cycles. In this modification, the motor comprises a stator unit S', a casing C' and a rotor unit R', the said casing C' including the front end cover 96 and the rear end cover 98. The stator S' embodies a construction substantially the same as or similar to the stator S previously described, except that in this modification the stator cup or shell 100 in addition to having its front end inturned to produce an abutting shoulder 102, has its rear end also inturned to provide an abutting shoulder 104. The rotor R' is similar in construction to the rotor R above described, the rotor R' including the rotor shaft 106, the front ball bearing 108 and the rear ball bearing 110. To provide for a path for the circulating of a cooling medium through the motor parts as indicated by the flow arrows 112 shown in Fig. 8 of the drawings, the end covers 96 and 98 are constructed as best shown in Figs. 10 to 13 of the drawings and are related to the stator S' and the tubular section 114 of the casing C' in a manner presently to be described.

The front end cover 96 is provided with a flange or rim 116 having an external diameter equal to the internal diameter of the adjacent portion of the tubular casing 114 and is provided with a seat 118 for receiving the spun or inturned end 120 of this end of the tubular casing 114. This front end cover is also provided with a plurality of inset legs 122, each provided with an angular seat 124, these seats, disposed circumferentially, serving to receivingly seat the casing shoulder 102. The front end cover 96 is also provided with the central boss 126 which defines the bearing hole $h^3$, this being similar in structure and purpose to the corresponding parts of the front end cover 46 previously described. The rear end cover 98 is provided with the flange or rim 128 having an outside diameter equal to the inside diameter of the rear end of the tubular casing 114 so as to snugly fit the same, and is provided with a shoulder seat 130 over which the rear end 132 of the tubular casing 114 is spun or inturned, as best shown in Fig. 8 of the drawings. This end cover is also provided with a plurality of extending legs 134 each of which is formed with an angular seat 136, which seats, circumferentially arranged, receive the inturned edge or shoulder 104 of the stator shell 100. This end cover is provided with a centrally arranged boss 138 which defines the smaller bearing hole $h^4$ similar in structure and purpose to the form of the invention above described.

By means of this recited construction, the end covers 96 and 98 may be assembled as before in longitudinal abutting relation with the bearing holes of the end covers and the bore of the stator perfectly aligned, the stator S' in this case being, however, so supported by the end covers 96 and 98 that while the tubular casing 114 may be secured to the end covers as before to produce a unified and rigid assembly, the stator unit S' is, however, spaced from the tubular casing 114 by an annular space 140, the outside diameter of the stator cup 100 in this case being to this extent smaller than the inside diameter of the tubular casing 114. The spacing of the legs 122 of the front end cover 96 defines orifices or openings therein arranged circumferentially of the end cover, which register with a series of circumferential openings or orifices 142 formed in the tubular casing section 114. The rear end cover 98 is provided towards its center with a plurality of orifices 144. There is thus provided a flow path for a cooling medium. The air or other cooling medium enters through the orifices 142, passes the openings defined by the legs 122, impinges against the end turns of the stator coils and then flows rearwardly through the motor in the space 140 between the stator and the casing shell, and then over and striking the end turns at the rear end of the stator and out through the orifices 144 in the rear end cover. An efficient method of cooling is thus provided in a structure which enables all of the constructional principles of the invention to be employed.

For inducing the circulation of the cooling medium, this motor is provided with a blower or fan 146 having a hub 148 mounted on an extension 150 of the rotor shaft, the said blower being provided with the vanes 152. Encasing this blower is a blower cover 154 detachably attached to the rear end cover 98 as by means of screws 156. This blower cover is provided with the circumferentially arranged orifices 158 through which the air centrifugally acted upon by the blower exits, as best shown in Fig. 8 of the drawings. In this form of the invention, the leads or conductors 160 may be threaded through one of the openings 142.

The method of constructing and assembling electric motors and the resulting motor assemblies embodying the principles of the present invention, and the many advantages thereof, both from the standpoint of manufacturing method and consuming use, will in the main be fully apparent from the above detailed description thereof. It will be further apparent that while we have shown and described the principles of the invention in connection with the making of electric motors, the same principles will govern the construction and assembling of similar units intended as generators instead of motors. It will be understood that such changes and other changes that may be made without departing from the spirit of the present invention, are intended to be covered by the following claims.

We claim:

1. A motor assembly comprising a front end cover, a stator unit and a rear end cover, assembled and arranged in abutting relation, central bearing holes in the end covers and the bore of the stator unit being in alignment, a tubular casing shell the end portions of which fit over the outside walls of the end covers arranged and extending over the assembled end covers and the stator unit, the ends of the tubular casing shell being secured to the end covers to complete the assembly of and to secure together the casing, stator unit and end covers, and a rotor unit inserted into the said assembly, the said rotor unit having end bearings mating with the bearing holes of the said end covers.

2. The motor assembly of claim 1 in which the ends of the tubular casing are inturned into engagement with the end covers to secure together the casing, stator unit and end covers.

3. A motor assembly comprising a front end cover, a stator unit and a rear end cover assembled and arranged in abutting relation, central bearing holes in the end covers and the bore of the stator unit being in alignment, the said end covers and stator unit having the same outside diameter, a tubular casing shell fitting and extending over the assembled end covers and the stator unit, the ends of the tubular casing shell being secured to the end covers to complete the assembly of and to secure together the casing, stator unit and end covers, and a rotor unit inserted into the said assembly, the said rotor unit having end bearings mating with the bearing holes of the said end covers.

4. A motor assembly comprising a front end cover, a stator unit and a rear end cover assembled and arranged in abutting relation, central bearing holes in the end covers and the bore of the stator unit being in alignment, the said end covers having the same outside diameter and the said stator unit having an outside diameter smaller than that of the end covers, a tubular casing shell the end portions of which fit over the outside walls of the end covers arranged and extending over the assembled end covers and stator unit, the ends of the tubular casing being secured to the end covers to complete the assembly of and to secure together the casing, stator unit and end covers, and a rotor unit inserted into the said assembly, the said rotor unit having end bearings mating with the bearing holes of the said end covers.

5. A motor assembly comprising a front end cover, a stator unit and a rear end cover, assembled and arranged in abutting relation, the said end covers having side flanges which abut edge walls of the stator unit, central bearing holes in the end covers and the bore of the stator unit being in alignment, the flanges of said end covers being of the same outside diameter, a tubular casing shell closely fitting over the flanges of the end covers arranged over the assembled end covers and the stator unit, the ends of the tubular casing shell being secured to the end covers to complete the assembly of and to secure together the casing, stator unit and end covers, and a rotor unit inserted into the said assembly, the said rotor unit having end bearings mating with the bearing holes of the said end covers.

6. A motor assembly comprising a front end cover, a stator unit and a rear end cover, assembled and arranged in abutting relation, the said end covers having side flanges which abut edge walls of the stator unit, central bearing holes in the end covers and the bore of the stator unit being in alignment, the flanges of said end covers and the outside wall of the stator unit being of the same outside diameter, a tubular casing shell closely fitting over the flanges of the end covers and the outside wall of the stator unit, the ends of the tubular casing shell being inturned into engagement with seats provided in the end covers to complete the assembly of and to secure together the casing, stator unit and end covers, and a rotor unit inserted into the said assembly, the said rotor unit having end bearings mating with the bearing holes of the said end covers.

7. A motor assembly comprising a front end cover, a stator unit and a rear end cover, assembled and arranged in abutting relation, central bearing holes in the end covers and the bore of the stator unit being in alignment and the bearing hole of one end cover being at least equal in diameter to that of the bore of the stator unit, a tubular casing shell the end portions of which fit over the outside walls of the end covers arranged and extending over the assembled end covers and the stator unit, the ends of the tubular casing being secured to the end covers to complete the assembly of and to secure together the casing, stator unit and end covers, and a rotor unit inserted into the said assembly, the said rotor unit having end bearings mating with and fitting the bearing holes of the said end covers.

8. A motor assembly comprising a front end cover, a stator unit and a rear end cover, assembled and arranged in abutting relation, central bearing holes in the end covers and the bore of the stator unit being in alignment, a tubular casing shell the end portions of which fit over the outside walls of the end covers arranged and extending over the assembled end covers and the stator unit, the outside wall of the stator unit being of less diameter than the inside wall of the tubular casing to provide an annular space therebetween, orifices in the end covers communicating with said space and providing a path for circulating a cooling medium through the casing and around the stator unit, the ends of the tubular casing being secured to the end covers to complete the assembly of and to secure together the casing, stator unit and end covers, and a rotor unit inserted into the said assembly, the said rotor unit having end bearings mating with the bearing holes of said end covers.

9. A motor assembly comprising a front end cover, a stator unit and a rear end cover, assembled and arranged in abutting relation, central bearing holes in the end covers and the bore of the stator unit being in alignment, a tubular casing shell the end portions of which fit over the outside walls of the end covers arranged and extending over the assembled end covers and the stator unit, the outside wall of the stator unit being of less diameter than the inside wall of the tubular casing to provide an annular space therebetween, orifices in the end covers communicating with said space and providing a path for circulating a cooling medium through the casing and around the stator unit, the ends of the tubular casing being secured to the end covers to complete the assembly of and to secure together the casing, stator unit and end covers, a rotor unit inserted into the said assembly, the said rotor unit having end bearings mating with the bearing holes of said end covers, a blower attached to an end of the rotor unit, and a blower cover encasing the same and secured to the end cover at said rotor end.

10. A motor assembly comprising a front end cover, a stator unit and a rear end cover assembled and arranged in abutting relation, central bearing holes in the end covers and the bore of the stator unit being in alignment, a tubular casing the end portions of which fit over the outside walls of the end covers arranged and extending over the assembled end covers and the stator unit, the outside wall of the stator unit being of less diameter than the inside wall of the tubular casing to provide an annular space therebetween, orifices in the end covers communicating with said space and providing a path for circulating a cooling media through the casing and around the stator unit, the orifices in one end cover being at its circumference and in the other end cover towards its center, the ends of the tubular casing being secured to the end covers to complete the assembly of and to secure together the casing, stator unit and end covers, a rotor unit inserted into the said assembly, the said rotor unit having end bearings mating with the bearing holes of said end covers, a blower attached to the end of the rotor unit at the said other end cover, and a blower cover provided with circumferential openings secured to said other end cover.

11. A motor assembly comprising a front end cover, a stator unit and a rear end cover, assembled and arranged in abutting relation, a tubular casing shell the end portions of which fit over the outside walls of the end covers arranged over the assembled end covers and the stator unit, the outside wall of the stator unit being of less diameter than the inside wall of the tubular casing to provide an annular space therebetween, orifices in the end covers communicating with said space and providing a path for circulating a cooling media through the casing and around the stator unit, the ends of the tubular casing being secured to the end covers to complete the assembly of and to secure together the casing, stator unit and end cover, and a rotor unit inserted into the said assembly.

HUGH G. HAMILTON.
LEONARD C. PRATT.
ALFRED SKROBISCH.